United States Patent
Eriksson

(10) Patent No.: US 11,198,376 B2
(45) Date of Patent: Dec. 14, 2021

(54) HIGH VOLTAGE ELECTRICAL SYSTEM FOR A VEHICLE AND METHOD OF CONTROLLING THE SYSTEM

(71) Applicant: Volvo Car Corporation, Gothenburg (SE)

(72) Inventor: Robert Eriksson, Hälta (SE)

(73) Assignee: Volvo Car Corporation, Gothenburg (SE)

(*) Notice: Subject to any disclaimer, the term of this patent is extended or adjusted under 35 U.S.C. 154(b) by 261 days.

(21) Appl. No.: 16/281,607

(22) Filed: Feb. 21, 2019

(65) Prior Publication Data
US 2019/0283625 A1    Sep. 19, 2019

(30) Foreign Application Priority Data

Mar. 19, 2018    (EP) .................................. 18162526

(51) Int. Cl.
| | |
|---|---|
| *H02J 7/00* | (2006.01) |
| *B60L 58/22* | (2019.01) |
| *B60L 50/60* | (2019.01) |
| *B60L 58/20* | (2019.01) |
| *B60L 58/18* | (2019.01) |

(Continued)

(52) U.S. Cl.
CPC ............. *B60L 58/22* (2019.02); *B60L 50/66* (2019.02); *B60L 58/18* (2019.02); *B60L 58/20* (2019.02); *H02J 7/0013* (2013.01); *H02J 7/0014* (2013.01); *H02J 7/0024* (2013.01); *B60L 2210/12* (2013.01); *B60L 2210/14* (2013.01);

(Continued)

(58) Field of Classification Search
CPC ...................................................... B60L 58/22

USPC ........................................................ 320/109
See application file for complete search history.

(56) References Cited

U.S. PATENT DOCUMENTS

| | | | | |
|---|---|---|---|---|
| 6,891,352 B2* | 5/2005 | Miyazaki | .............. | H02J 7/0022 320/118 |
| 7,248,020 B2* | 7/2007 | Hidaka | .............. | G01R 31/3835 320/134 |

(Continued)

FOREIGN PATENT DOCUMENTS

| | | |
|---|---|---|
| WO | 2013042244 A1 | 3/2013 |
| WO | 2013159887 A1 | 10/2013 |

OTHER PUBLICATIONS

Sep. 19, 2018 European Search Report issue on International Application No. EP18162526.

*Primary Examiner* — Yalkew Fantu
(74) *Attorney, Agent, or Firm* — Clements Bernard Walker; Christopher L. Bernard

(57) ABSTRACT

A high voltage electrical system for a vehicle, the system comprising: a high voltage battery unit having a first high voltage battery connected in series with a second high voltage battery such that a nominal operating voltage of the battery unit is the sum of a voltage of the first high voltage battery and a voltage of the second high voltage battery; a bi-directional high voltage DC/DC-converter connected in parallel with the first high voltage battery and with the second high voltage battery, the DC/DC-converter being arranged to receive a charging voltage from a high voltage inlet or from a propulsion converter connected to an electrical machine; wherein the DC/DC converter is configured to control charging of the first and second high voltage battery to balance a state of charge of the first and second high voltage battery.

15 Claims, 1 Drawing Sheet

(51) Int. Cl.
  *H02J 1/00* (2006.01)
  *H02J 1/08* (2006.01)
(52) U.S. Cl.
  CPC ............ *B60Y 2200/91* (2013.01); *H02J 1/00* (2013.01); *H02J 1/082* (2020.01)

(56) References Cited

U.S. PATENT DOCUMENTS

| | | | |
|---|---|---|---|
| 2012/0003507 A1* | 1/2012 | Krieg | H01M 10/4207 |
| | | | 429/7 |
| 2012/0038216 A1* | 2/2012 | Berry | B60L 11/1879 |
| | | | 307/77 |
| 2016/0254576 A1* | 9/2016 | Burns | H01M 10/486 |
| | | | 429/61 |
| 2018/0001772 A1 | 1/2018 | Jang et al. | |
| 2018/0072178 A1 | 3/2018 | Williams | |
| 2018/0319287 A1* | 11/2018 | Forssell | H01M 10/6551 |
| 2019/0168632 A1* | 6/2019 | Deng | B60L 50/64 |

* cited by examiner

HIGH VOLTAGE ELECTRICAL SYSTEM FOR A VEHICLE AND METHOD OF CONTROLLING THE SYSTEM

CROSS-REFERENCE TO RELATED APPLICATION

The present patent application/patent claims the benefit of priority of co-pending European Patent Application No. 18162526.0, filed on Mar. 19, 2018, and entitled "HIGH VOLTAGE ELECTRICAL SYSTEM FOR A VEHICLE AND METHOD OF CONTROLLING THE SYSTEM," the contents of which are incorporated in full by reference herein.

TECHNICAL FIELD

The present invention relates to a high voltage electrical system for a vehicle. Moreover, the present invention relates to balancing of a first high voltage battery and a second high voltage battery of the electrical system.

BACKGROUND ART

Electric vehicles generally relate to vehicles that have batteries or battery units that store energy, where the batteries are designed to provide electrical power for propelling and accelerating the vehicle and also for providing power to electrical systems used in the vehicle. The stored energy is consumed when the electric vehicle is driven and the battery needs to be re-charged in order to replenish the level of stored energy through a connection to an external electric power supply.

For high performance electric vehicles having a longer driving range and larger battery, a dedicated quick charger is often used to charge the vehicle battery. Such a dedicated charging station is provided with DC supply to the vehicle through a specific charge connector and the charger is positioned in the charging station.

For high performance vehicles, there is a demand for a longer driving range and for higher power output. Most high performance vehicles use a high voltage system of around 400 volts for the propulsion of the vehicle and possibly for some high power components of the vehicle, such as the climate control compressor or a heating system. Most electronics of the vehicle is powered by a low voltage of 12 volt and/or 48 volt. Such a vehicle is provided with a 12 volt battery and either a 48 volt battery or a 400 to 48 volt DC/DC-converter.

When demands increase for high performance vehicles, a 400 volt system may not be optimal. A higher voltage level of the electric system will reduce power losses and the weight of electric cables, but require new components for the higher voltage level. Further, it must also be possible to charge such a vehicle from existing charging stations without the need of an additional power converter. In one example, a vehicle may be provided with an electrical system using 800 volt, but a charger station may supply a charge current with 400 or 500 volts. In this case, an additional power converter is needed. Common examples of high power chargers are CHAdeMO, SAE Combined Charging System and Tesla Superchargers. They are mostly limited to a voltage of 400-500 volts. There exists charging stations with higher voltage ratings, but these are not common.

There is thus room for an improved battery electrical system for a vehicle.

SUMMARY

In general, the disclosed subject matter relates to a high voltage electrical system for a vehicle. The system comprises a high voltage battery unit having a first high voltage battery connected in series with a second high voltage battery such that a nominal operating voltage of the battery unit is the sum of a voltage of the first high voltage battery and a voltage of the second high voltage battery. The high voltage electrical system is thereby capable of operating at two separate voltages such as 400V and 800V. The system further comprises a bi-directional high voltage DC/DC-converter connected in parallel with the first high voltage battery and with the second high voltage battery.

By providing a charging voltage to the DC/DC-converter either from an external charging station of from a propulsion converter connected to an electrical machine, the DC/DC converter can charge the first and second high voltage battery to balance a state of charge of the first and second high voltage battery.

The disclosed system is particularly advantageous in that charging and battery balancing can be achieved for different charging voltages and for different sources, i.e. both from an external charger and from a propulsion converter in a convenient manner and with few components.

Features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

Figure 1:
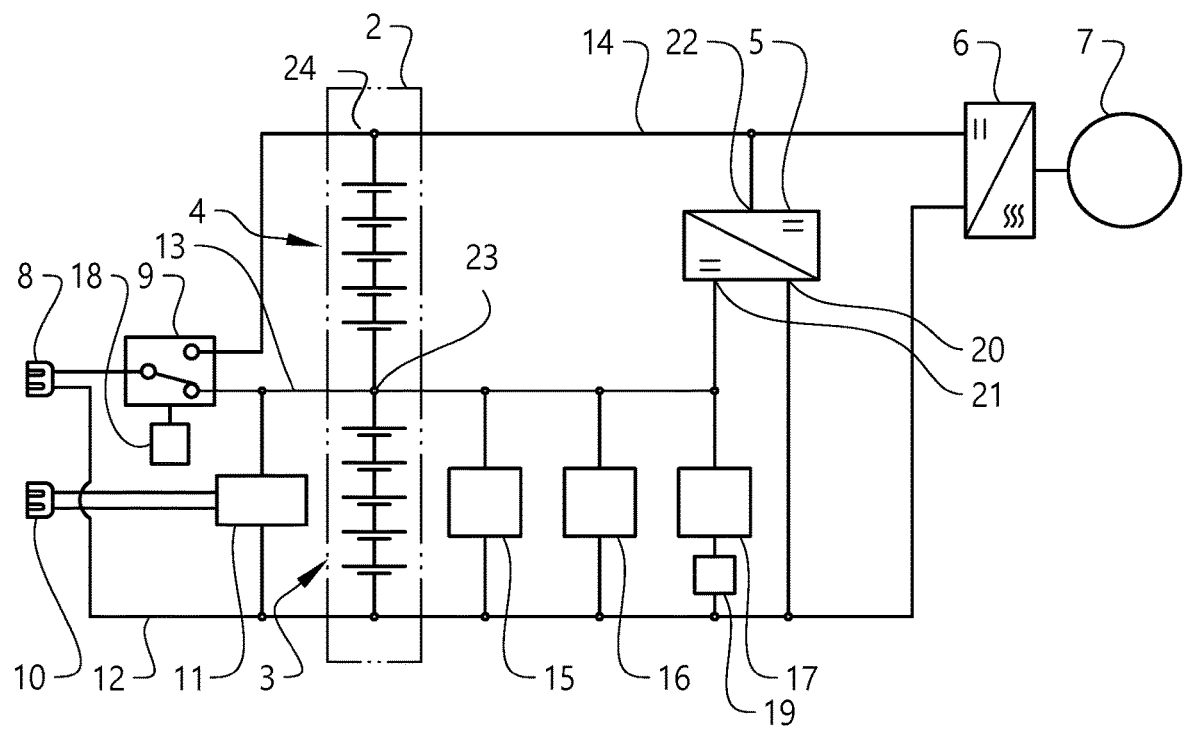
FIG. 1 schematically illustrates an electrical system according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 schematically illustrates a high voltage electrical system 1 for a vehicle 30 according to an example embodiment of eh invention The high voltage electrical system 1 comprises a high voltage battery unit 2 having a first high voltage battery 3 connected in series with a second high voltage battery 4 such that a nominal operating voltage of the battery unit 2 is the sum of a voltage of the first high voltage battery 3 and a voltage of the second high voltage battery 4. The system further comprises a bi-directional high voltage DC/DC-converter 5 connected to both the first high voltage battery 3 and with the second high voltage battery 3.

The DC/DC-converter 5 is arranged to receive a charging voltage from a high voltage inlet 8 or from a propulsion converter 6 connected to an electrical machine 7. Moreover, the DC/DC converter 5 is configured to control charging of the first high voltage battery 3 and the second high voltage battery 4 to balance a state of charge of the first and second high voltage battery 3, 4. The electric machine 7 is connected to the electrical system 1 through a propulsion converter 6, adapted to convert the voltage of the high voltage battery unit to a voltage suitable for the electric machine. In the shown example, a three-phase electric machine is used. The propulsion converter 6 will thus convert the DC voltage of the high voltage battery unit to a three-phase AC voltage when the vehicle is driving. The propulsion converter will further convert the three-phase AC voltage supplied from the electric machine to a DC voltage for charging the high voltage battery unit when energy is recuperated, e.g. when reducing the speed of the vehicle.

Various embodiments of the present invention will be described with reference to a system where the first high voltage battery 3 and the second high voltage battery 4 have the same nominal voltage and preferably have the same nominal capacity. The first high voltage battery 3 has in one example a nominal voltage of 400V. The voltage may vary some but has a conventional high voltage level adapted to be charged from conventional high voltage DC chargers with an output of up to 500V. The same thus applies for the second high voltage battery 4. In this description, the nominal voltage of 400V will be used for the first high voltage battery 3 and the second high voltage battery 4. The nominal operating voltage of the high voltage battery unit 2 will thus be 800V. Thereby, the propulsion converter 6 is arranged to receive 800V DC which is converted to a controllable AC voltage between 0V and 800V AC for powering the electrical machine 7.

The voltage of the first high voltage battery 3 and the second high voltage battery 4 may be chosen freely, but it is of advantage if the first high voltage battery corresponds to a conventional high voltage level adapted to be charged from conventional high voltage DC chargers with an output of up to 500 volts. In particular, the use of a 400V battery allows for the use of existing 400V components.

It is also possible to let the voltage of the first high voltage battery be 400V and to let the voltage of the second high voltage battery be e.g. 600V. The voltage of the high voltage battery unit 2 would in this case be 1000V. The advantage of providing the first high voltage battery 3 with 400V is that existing high voltage components may be used and powered from the first high voltage battery 3 regardless of the voltage of the second high voltage battery 4. By enabling the use of existing 400V components in the system, the overall cost of the system will be lower with maintained quality and reliability.

As illustrated in FIG. 1, the first high voltage battery 3 and the second high voltage battery 4 are connected in series in the high voltage battery unit 2. The high voltage battery unit 2 will thereby be able to provide three voltage levels or bus voltage levels. The first voltage level is the zero voltage level or the ground bus 12, which is the low voltage reference having a voltage of 0V. The second voltage level is the high voltage level of the 400V volt bus 13, which is the intermediate connection of the high voltage battery unit where the first high voltage battery 3 and the second high voltage battery 4 are connected to each other. The third voltage level is high voltage level of the 800V bus 14, which is the nominal voltage of the high voltage battery unit 2.

The bi-directional high voltage DC/DC-converter 5 is connected in parallel with both the first high voltage battery 3 and the second high voltage battery 4, and also with the high voltage battery unit 2. The ground terminal 20 of the bi-directional high voltage DC/DC-converter 5 is connected to the ground bus 12. The first Input/Output (I/O) terminal 21 is connected to the 400V bus 13 and the second I/O terminal 22 is connected to the 800V bus 14.

In the present example, the bi-directional high voltage DC/DC-converter is adapted to either convert a 400 volt DC voltage to 800 volts or to convert an 800 volt DC voltage to 400 volts. Thereby, the DC/DC-converter 5 is arranged in parallel with the first high voltage battery 3 between the ground terminal 20 and the first Input/Output terminal 21, in parallel with the second high voltage battery 4 between the first Input/Output terminal 21 and the second Input/Output terminal 22, and in parallel with the high voltage battery unit 2 between the ground terminal 20 and the second Input/Output terminal 22.

Accordingly, through the described arrangement and configuration of the DC/DC converter, the DC/DC converter is capable of distributing energy to the first and second high voltage battery 3, 4. For example, it is possible to provide 400V over the first and second high voltage batteries 3, 4 and 800V over the high voltage battery unit.

The system 1 further comprises a measuring circuit (not shown) that is configured to monitor and control the status of the high voltage battery unit 2. In particular, the State Of Charge (SOC) of the first high voltage battery 3 and the second high voltage battery 4 is monitored. The SOC is monitored for the first and the second high voltage batteries 3, 4 when the high voltage battery unit 2 is being charged by an external charger as well as when the vehicle is driving. The SOC values are used to control the DC/DC-converter to balance the charge current to the first high voltage battery 3 and to the second high voltage battery 4 in order to reach balance for the SOC, which for two batteries of the same type means that the SOC is the same in both batteries.

The electrical system further comprises a high voltage DC switch 9 arranged at the high voltage DC inlet 8 of the vehicle, where the high voltage inlet 8 is configured to be connected to an external charging station to receive a DC voltage. The electrical switch 9 is arranged between the high voltage inlet 8 and the first and second high voltage battery 3, 4 and configured to connect the high voltage inlet 8 either to an input terminal 23 of the first high voltage battery 3 and to a first I/O terminal 21 of the DC/DC converter or to an input terminal 24 of the high voltage battery unit 2 and to a second I/O terminal 22 of the DC/DC converter 5.

The switch 9 is thus adapted to connect the high voltage inlet 8 to either the 800V bus 14, i.e. the input terminal 24 of the high voltage battery unit 2, or to the 400V bus 13, i.e. the input terminal 23 of the first high voltage battery 3, depending on the voltage of the charging station. In further detail, the switch is configured to connect the high voltage inlet 8 to the input terminal 23 of the first high voltage battery 3 and to the first I/O terminal 21 of the DC/DC converter for a charging voltage corresponding to a nominal operating voltage of the first high voltage battery 3 and to connect the high voltage inlet 8 to the input terminal 24 of the high voltage battery unit 2 and to the second I/O terminal 22 of the DC/DC converter 5 for a charging voltage corresponding to a nominal operating voltage of the high voltage battery unit 2.

Preferably, the switch 9 will switch between the two busses 13, 14 automatically. The switch 9 is in this example controlled by an Electronic Control Unit (ECU) 18 of the vehicle which controls and monitors the charging of the high voltage battery unit. The ECU 18 exchanges data with the charging station by communicating with the charging station when a charging connector is connected to the high voltage inlet 8 of the vehicle. In principle, the switch may be omitted if separate charge connectors are used for the 800 volt bus and the 400 volt bus.

The ECU may also be configured to control the overall functionality of the electrical system 1. However, it is also possible to use a plurality of ECU for controlling different portions and/or functions of the system. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

As further illustrated in FIG. 1, the electrical system is adapted to supply additional loads, here illustrated as being connected in parallel with the first high voltage battery 3. A first load 15 may comprise different high voltage components such as a climate control compressor or heater elements, etc. which may be operated at 400V. The first load 15 may also comprise one or more additional DC/DC-converters, adapted to convert the high voltage to a lower voltage. The shown electrical system comprises an optional 400/48 volt DC/DC-converter 16 used to power 48 volt components, which may also be existing or potential carry-over components from conventional vehicles comprising a combustion engine or from plug-in hybrid vehicles, e.g. a power steering pump or headlight drivers, and a 400/12 volt DC/DC-converter 17 used to power conventional 12 volt components, and also to charge a 12 volt battery 19 connected to the regular low voltage electrical system of the vehicle.

According to an example embodiment, the DC/DC converter is configured to, when receiving a charging voltage lower than the nominal operating voltage of the battery unit 2, operate in a boost mode to charge the high voltage battery unit 2 with a voltage corresponding to the nominal voltage of the high voltage battery unit 2.

In a first charging example, the high voltage inlet 8 is connected to a charging station that delivers 400 volt DC. The switch will in this case connect the high voltage inlet 8 to the 400 volt bus 13. The first high voltage battery 3 is now charged with 400 volts, and the bi-directional high voltage DC/DC-converter 5 is set to a boost mode, where it will convert the 400V level to an 800V level. The bi-directional high voltage DC/DC-converter will thus feed 800V to the 800V bus 14, thereby charging the second high voltage battery 4. The output voltage of the bi-directional high voltage DC/DC-converter 5 could be varied to some extent in order to control the balance between the first high voltage battery 3 and the second high voltage battery 4, since some of the first second or third loads 15, 16, 17 may be active and require a current. In this way, the complete high voltage battery unit 2 is charged. The first high voltage battery 3 is charged directly from the external charger station, and the second high voltage battery 4 is charged through the bi-directional high voltage DC/DC-converter 5.

Even though the propulsion converter 6 preferably provides a voltage to the DC/DC converter equal to the voltage of the high voltage battery unit 2, e.g. 800V, the above scenario would also be applicable if the DC/DC converter 5 receives a charging voltage from the propulsion converter 6 which is lower than the nominal operating voltage of the battery unit 2.

According to an example embodiment, the DC/DC converter 5 is further configured to, when receiving a charging voltage which is higher than a nominal operating voltage of the first high voltage battery 3, operate in a buck mode to provide a voltage to the first high voltage battery 3 corresponding to the nominal operating voltage of the first high voltage battery 3.

To exemplify, the high voltage DC inlet 8 may be connected to a charging station that delivers 800V. The switch 9 will in this case connect the high voltage inlet 8 to the 800V bus 14. The complete high voltage battery unit 2 is now charged with 800V, i.e. the first high voltage battery and the second high voltage battery are charged with the same current. If some of the loads 15, 16, 17 are active during the charging process, the first high voltage battery 3 will in this case supply current to the loads, which means that there will be an unbalance in the charging of the first high voltage battery 3 and the second high voltage battery 4. To compensate for this imbalance, the first high voltage battery 3 is supplementary charged through the bi-directional high voltage DC/DC-converter 5 operating in a buck mode, supplying additional current to the 400V bus 13. In this way, the SOC of the first high voltage battery 3 and the second high voltage battery 4 can be balanced. The output voltage of the bi-directional high voltage DC/DC-converter 5 is in this case set to half the voltage of the charger station.

The same as above also applies during operation of the vehicle when energy is recuperated by the electric machine 7 e.g. by braking. The 800V bus 14 is now supplied with a high voltage, e.g. 800V, through the propulsion converter 6, and the bi-directional high voltage DC/DC-converter 5 is used to charge the high voltage battery unit 2. The bi-directional high voltage DC/DC-converter 5 can also be used to balance the current to the first and the second high voltage batteries 3, 4.

It is also possible to allow for a temporary unbalance in the SOC of the first high voltage battery 3 and the second high voltage battery 4, i.e. to let the SOC of the first high voltage battery 3 and the second high voltage battery 4 be different, if only temporarily. This may e.g. be the case when the vehicle is accelerating or driving at high speed. The electric machine 7 will in this case need a high current from the high voltage battery unit 2. If some of the high voltage components 15, 16, 17 also requires a high current at the same time, e.g. if the climate control is working hard, the SOC of the first high voltage battery 3 may be allowed to drop more than the SOC of the second high voltage battery 4 until operating conditions are back to normal with a more balanced current demand. If the SOC of the first high voltage battery 3 falls below a predefined value, the first high voltage battery 3 can be charged through the bi-directional high voltage DC/DC-converter.

The shown electrical system further comprises an AC charger 11 integrated in the vehicle and adapted to charge the first high voltage battery 3 through an AC inlet 10. The output of the AC charger 11 is connected to the 400 volt bus and will thus charge the first high voltage battery 3 when an external AC power source is connected to the AC inlet 10 of the vehicle. In this case, the bi-directional high voltage DC/DC-converter 5 will be set in a boost mode and will charge the second high voltage battery 4. Since built-in AC chargers normally provide a relatively limited charge current, the charge current will be substantially divided between the first high voltage battery 3 and the bi-directional high voltage DC/DC-converter 5 charging the second high voltage battery 4.

Figure 2:
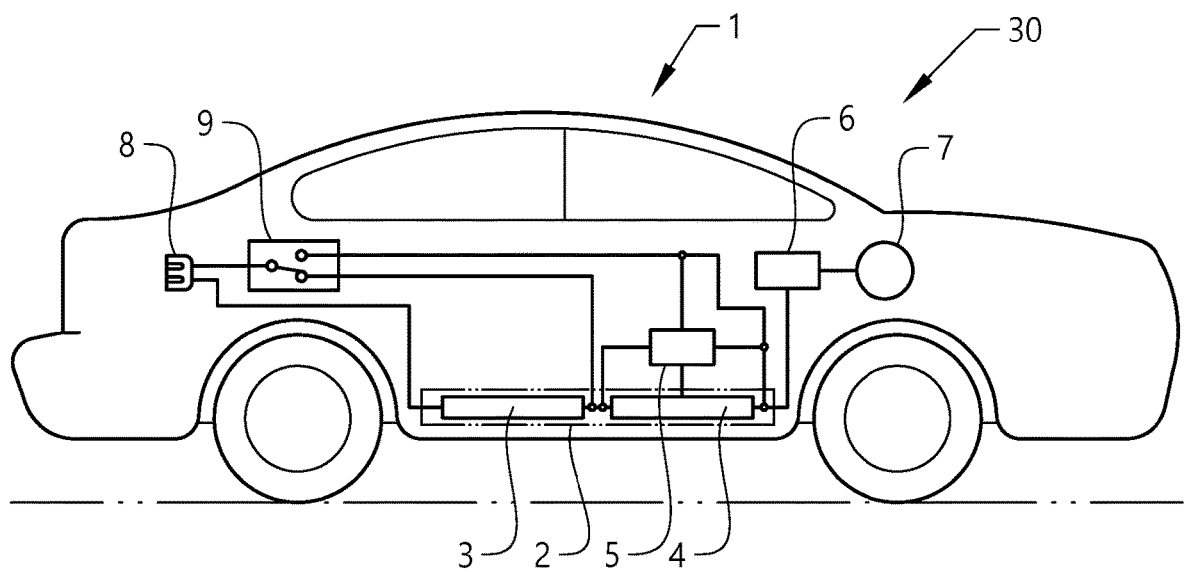
FIG. 2 schematically illustrates a vehicle comprising an electrical system according to an embodiment of the invention.

FIG. 2 shows a schematic vehicle 30 comprising an electrical system 1 according to embodiments of the invention. The electrical system 1 may be positioned at any position of the vehicle, but is advantageously arranged close to the high voltage battery unit 2 and/or the electric machine 7. The electric machine 7 may be arranged at the front or at the rear of the vehicle, at one of the wheel axles. The electric machine may also be divided in two or more electric machines, where one electric machine may be arranged at each wheel axle or at each wheel.

Embodiments of the described invention also relate to methods of controlling the electrical system. The control method is preferably performed by one or more ECUs of the vehicle.

An example method comprises controlling the bi-directional high voltage DC/DC-converter (5) connected in parallel with the first high voltage battery 3 and with the second high voltage battery 4 to balance a state of charge of the first and second high voltage battery 3, 4 for a received charging voltage from the high voltage inlet 8 or from the propulsion converter 6 connected to an electrical machine 7.

Another example method comprises, for a received charging voltage lower than the nominal operating voltage of the battery unit 2, operating the bi-directional high voltage DC/DC converter 5 in a boost mode to charge the high voltage battery unit 2 with a voltage corresponding to the nominal voltage of the high voltage battery unit 2.

An example method comprises, when receiving a charging voltage from the propulsion converter 5 which is higher than a nominal operating voltage of the first high voltage battery 3, operating the bi-directional high voltage DC/DC converter 5 in a buck mode to provide a voltage to the first high voltage battery 3 corresponding to the nominal operating voltage of the first high voltage battery 3.

An example method comprises, when receiving a charging voltage from the propulsion converter 6, operating the bi-directional high voltage DC/DC converter 5 to control the current to the first and second high-voltage battery 3, 4 to balance the state-of charge of the first and second high-voltage battery 3, 4 based on an operating voltage of the first and second battery 3, 4.

An example method comprises operating the bi-directional high voltage DC/DC-converter (5) based on a load connected to either of the first high voltage battery (3) and the second high voltage battery (4).

An example method comprises controlling an electrical switch 9 arranged between the high voltage inlet 8 and the first and second high voltage battery 3, 4 to connect the high voltage inlet 8 either to an input terminal 23 of the first high voltage battery 3 and to a first I/O terminal 21 of the bi-directional high voltage DC/DC converter 5 or to an input terminal 24 of the high voltage battery unit 2 and to a second I/O terminal 22 of the bi-directional high voltage DC/DC converter 5.

An example method comprises controlling the switch 9 to connect the high voltage inlet 8 to the input terminal 23 of the first high voltage battery 3 and to the first I/O terminal 21 of the bi-directional high voltage DC/DC converter 5 for a charging voltage corresponding to a nominal operating voltage of the first high voltage battery 3.

An example method comprises controlling the switch 9 to connect the high voltage inlet 8 to the input terminal 24 of the high voltage battery unit 2 and to the second I/O terminal 22 of the bi-directional high voltage DC/DC converter for a charging voltage corresponding to a nominal operating voltage of the high voltage battery unit 2.

Even though the invention has been described with reference to specific exemplifying embodiments thereof, many different alterations, modifications and the like will become apparent for those skilled in the art. Also, it should be noted that parts of the system may be omitted, interchanged or arranged in various ways, the system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A high voltage electrical system for a vehicle, the system comprising:
   a high voltage battery unit having a first high voltage battery connected in series with a second high voltage battery such that a nominal operating voltage of the battery unit is the sum of a voltage of the first high voltage battery and a voltage of the second high voltage battery;
   a bi-directional high voltage DC/DC-converter connected in parallel with both the first high voltage battery and the second high voltage battery, the DC/DC-converter being arranged to receive a charging voltage from a high voltage inlet or from a propulsion converter connected to an electrical machine;
   wherein the DC/DC converter is configured to control charging of the first and second high voltage battery to balance a state of charge of the first and second high voltage battery when receiving the charging voltage from either the high voltage inlet or from the propulsion converter.

2. The high voltage electrical system according to claim 1, wherein the DC/DC converter is further configured to, when receiving a charging voltage lower than the nominal operating voltage of the battery unit, operate in a boost mode to charge the high voltage battery unit with a voltage corresponding to the nominal voltage of the high voltage battery unit.

3. The high voltage electrical system according to claim 1, wherein the DC/DC converter is further configured to, when receiving a charging voltage which is higher than a nominal operating voltage of the first high voltage battery, operate in a buck mode to provide a voltage to the first high voltage battery corresponding to the nominal operating voltage of the first high voltage battery.

4. The high voltage electrical system according to claim 1, wherein the DC/DC converter is further configured to, when receiving a charging voltage from the propulsion converter, control the current to the first and second high-voltage battery to balance the state-of charge of the first and second high-voltage battery based on an operating voltage of the first and second battery.

5. The system according to claim 1, further comprising an electrical switch arranged between the high voltage inlet and the first and second high voltage battery and configured to connect the high voltage inlet either to an input terminal of the first high voltage battery and to a first I/O terminal of the DC/DC converter or to an input terminal of the battery unit and to a second I/O terminal of the DC/DC converter.

6. The system according to claim 5, wherein the switch is configured to connect the high voltage inlet to the input terminal of the first high voltage battery and to the first I/O terminal of the DC/DC converter for a charging voltage corresponding to a nominal operating voltage of the first high voltage battery.

7. The system according to claim 5, wherein the switch is configured to connect the high voltage inlet to the input terminal of the high voltage battery unit and to the second I/O terminal of the DC/DC converter for a charging voltage corresponding to a nominal operating voltage of the high voltage battery unit.

8. A method for balancing the state-of-charge of a high voltage battery unit for a vehicle having a first high voltage battery connected in series with a second high voltage battery in a high voltage electrical system such that a nominal operating voltage of the battery unit is the sum of a voltage of the first high voltage battery and a voltage of the second high voltage battery, the method comprising:
controlling a bi-directional high voltage DC/DC-converter connected in parallel with both the first high voltage battery and the second high voltage battery to balance a state of charge of the first and second high voltage battery for a received charging voltage from either a high voltage inlet or from a propulsion converter connected to an electrical machine.

9. The method according to claim 8, further comprising, for a received charging voltage lower than the nominal operating voltage of the battery unit, operating the bi-directional high voltage DC/DC converter in a boost mode to charge the high voltage battery unit with a voltage corresponding to the nominal voltage of the high voltage battery unit.

10. The method according to claim 8, further comprising, when receiving a charging voltage from the propulsion converter which is higher than a nominal operating voltage of the first high voltage battery, operating the bi-directional high voltage DC/DC converter in a buck mode to provide a voltage to the first high voltage battery corresponding to the nominal operating voltage of the first high voltage battery.

11. The method according to claim 8, further comprising, when receiving a charging voltage from the propulsion converter, operating the bi-directional high voltage DC/DC converter to control the current to the first and second high-voltage battery to balance the state-of charge of the first and second high-voltage battery based on an operating voltage of the first and second battery.

12. The method according to claim 8, further comprising operating the bi-directional high voltage DC/DC-converter based on a load connected to either of the first high voltage battery and the second high voltage battery.

13. The method according to claim 8, further comprising controlling an electrical switch arranged between the high voltage inlet and the first and second high voltage battery to connect the high voltage inlet either to an input terminal of the first high voltage battery and to a first I/O terminal of the bi-directional high voltage DC/DC converter or to an input of the high voltage battery unit and to a second I/O terminal of the bi-directional high voltage DC/DC converter.

14. The method according to claim 13, further comprising controlling the switch to connect the high voltage inlet to the input terminal of the first high voltage battery and to the first I/O terminal of the bi-directional high voltage DC/DC converter for a charging voltage corresponding to a nominal operating voltage of the first high voltage battery.

15. The method according to claim 13, further comprising controlling the switch to connect the high voltage inlet to the input terminal of the high voltage battery unit and to the second I/O terminal of the bi-directional high voltage DC/DC converter for a charging voltage corresponding to a nominal operating voltage of the high voltage battery unit.

\* \* \* \* \*